(12) United States Patent
Chauhan

(10) Patent No.: US 10,867,035 B1
(45) Date of Patent: Dec. 15, 2020

(54) SYSTEMS AND METHODS FOR DETECTING MALICIOUS PROGRAMMATIC CLICKS DIRECTED TO VIEW ELEMENTS DISPLAYED ON TOUCHSCREENS

(71) Applicant: Symantec Corporation, Mountain View, CA (US)

(72) Inventor: Sachin Chauhan, Kharadi (IN)

(73) Assignee: NORTONLIFELOCK, INC., Tempe, AZ (US)

( * ) Notice: Subject to any disclaimer, the term of this patent is extended or adjusted under 35 U.S.C. 154(b) by 211 days.

(21) Appl. No.: 15/462,931

(22) Filed: Mar. 20, 2017

(51) Int. Cl.
*G06F 21/55* (2013.01)
*G06F 3/0488* (2013.01)

(52) U.S. Cl.
CPC ........ *G06F 21/554* (2013.01); *G06F 3/04886* (2013.01)

(58) Field of Classification Search
CPC ........................... G06F 21/554; G06F 3/04886
See application file for complete search history.

(56) References Cited

U.S. PATENT DOCUMENTS

| | | | | |
|---|---|---|---|---|
| 9,906,544 | B1 * | 2/2018 | Kurupati | H04L 63/1425 |
| 2016/0306974 | A1 * | 10/2016 | Turgeman | G06Q 20/4016 |
| 2016/0337386 | A1 * | 11/2016 | Ford | H04L 63/1416 |

OTHER PUBLICATIONS

Wu et al., "Analysis of Clickjacking Attacks and an Effective Defense Scheme for Android Devices" 2016 IEEE Conference on Communications and Network Security (CNS), pp. 1-9 (Year: 2016).*
Tchakounté et at., "System Calls Analysis of Malwares on Android" Sep. 2013, International Journal of Science and Technology (IJST)—vol. 2 No. 9, pp. 669-674 (Year: 2013).*

* cited by examiner

*Primary Examiner* — Harunur Rashid
(74) *Attorney, Agent, or Firm* — FisherBroyles, LLP

(57) ABSTRACT

The disclosed computer-implemented method for detecting malicious programmatic clicks directed to view elements displayed on touchscreens may include (1) receiving an indication of a click event directed to a view element of a user interface displayed on a touchscreen of a computing device, (2) determining that the click event was not immediately preceded by a touch event directed to the view element displayed on the touchscreen, (3) classifying, in response to determining that the click event was not immediately preceded by the touch event directed to the view element, the click event as potentially malicious, and (4) performing, in response to classifying the click event as potentially malicious, a security action that prevents performance of an operation requested by the click event. Various other methods, systems, and computer-readable media are also disclosed.

20 Claims, 7 Drawing Sheets

SYSTEMS AND METHODS FOR DETECTING MALICIOUS PROGRAMMATIC CLICKS DIRECTED TO VIEW ELEMENTS DISPLAYED ON TOUCHSCREENS

BACKGROUND

In recent years, malicious programmers have devised a variety of ways to automatically select elements displayed on touchscreen computing device, such as a cellular phone or a tablet, in order to perform malicious acts. For example, by exploiting known weaknesses in operating-system services like ANDROID's accessibility service (which provides a way for users with visual impairments or other disabilities to interact with ANDROID devices) or ANDROID's UI automator (which provides a user interface testing framework), a malicious program may activate buttons displayed on a device's touchscreen, without a user touching the touchscreen, in order to obtain unauthorized privileges, authorize fraudulent transactions, download malicious payloads, etc. This is particularly problematic when an accessibility mode, such as a large print mode, is active, as the buttons being maliciously clicked may not appear in the magnified portion of the screen, thus preventing the user from seeing the buttons on the computer's touchscreen that are being clicked. Accordingly, the malicious activity may go unnoticed by the user long enough for the malicious activity to have a harmful effect.

The instant disclosure, therefore, identifies and addresses a need for systems and methods for detecting malicious automated (or "programmatic") clicks directed to view elements displayed on touchscreens.

SUMMARY

As will be described in greater detail below, the instant disclosure describes various systems and methods for detecting malicious programmatic clicks directed to view elements displayed on touchscreens. In one example, a method for performing such a task may include receiving an indication of a click event directed to a view element of a user interface displayed on a touchscreen of a computing device; determining that the click event was not immediately preceded by a touch event directed to the view element displayed on the touchscreen; classifying, in response to determining that the click event was not immediately preceded by the touch event directed to the view element, the click event as potentially malicious; and performing, in response to classifying the click event as potentially malicious, a security action that prevents performance of an operation requested by the click event.

In one example, the indication of the click event may be received in a click event callback. In another example, the indication of the click event may be received when the computing device is operating in an accessibility mode.

The operation requested by the click event may take a variety of forms, including a request to grant privileges to an application, authorize a specific user to perform an operation on the computing device, authorize a transaction, access a local or remote computing resource, etc.

In one example, the security action may include preventing performance of the click event on the view element. In other examples, the security action may include identifying an application responsible for initiating the click event; quarantining the application responsible for initiating the click event; removing the application responsible for initiating the click event; and/or notifying a user of the computing device that the application responsible for initiating the click event is potentially malicious. In some examples, the view element displayed on the touchscreen may be in a view element class that includes a button widget, an edit text widget, a text view widget, a check box widget, an image view widget, a radio button widget, or a combination thereof.

In one embodiment, a system for detecting malicious programmatic clicks directed to view elements displayed on touchscreens may include several modules stored in memory, including a receiving module that receives an indication of a click event directed to a view element of a user interface displayed on a touchscreen of a computing device; a determining module that determines that the click event was not immediately preceded by a touch event directed to the view element displayed on the touchscreen; a classification module that classifies, in response to determining that the click event was not immediately preceded by the touch event directed to the view element, the click event as potentially malicious; a security module that performs, in response to classifying the click event as potentially malicious, a security action that prevents performance of an operation requested by the click event; and at least one physical processor coupled to the memory and configured to execute at least one module stored in the memory.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to receive an indication of a click event directed to a view element of a user interface displayed on a touchscreen of the computing device; determine that the click event was not immediately preceded by a touch event directed to the view element displayed on the touchscreen; classify, in response to determining that the click event was not immediately preceded by the touch event directed to the view element, the click event as potentially malicious; and perform, in response to classifying the click event as potentially malicious, a security action that prevents performing an operation requested by the click event.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
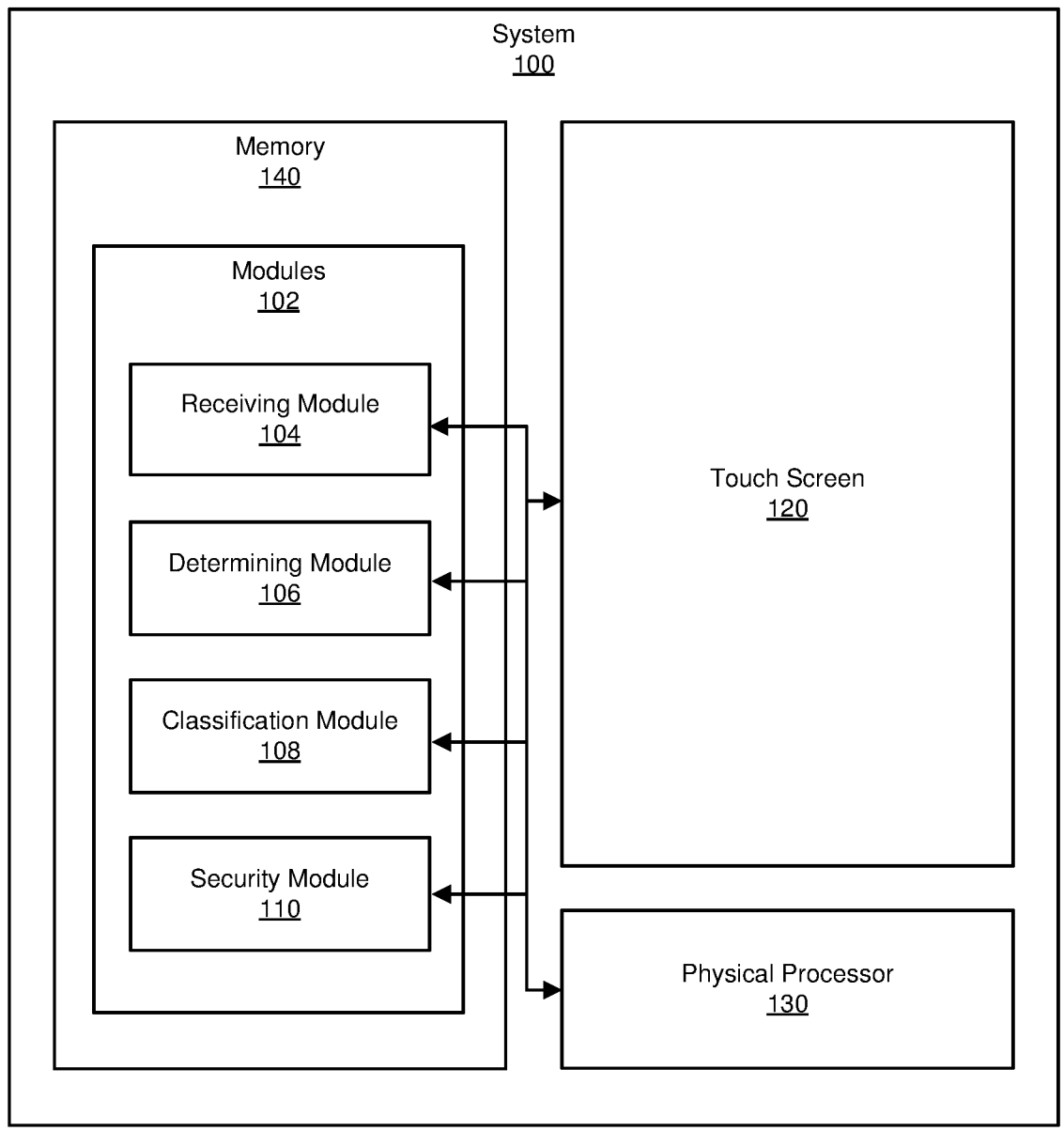
FIG. 1 is a block diagram of an example system for detecting malicious programmatic clicks directed to view elements displayed on touchscreens.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting malicious programmatic clicks directed to view elements displayed on touchscreens of computing devices such as mobile phones, tablet computers, and the like. As will be described in greater detail below, non-malicious clicks directed to view elements (e.g., radio buttons, text boxes, check boxes, etc.) are preceded or accompanied by a respective touch event (initiated, e.g., by a user) on a touchscreen. In contrast, malicious programmatic clicks directed to view elements are not accompanied by a respective touch event on a touchscreen.

Thus, the systems described herein may identify malicious programmatic clicks, and prevent and/or mitigate the effects of the same, by determining if a click event follows or is accompanied by a touch event. If a click event does not follow a touch event, then the systems described herein may classify the click event as potentially malicious and prevent a function associated with the click event from being performed or enabled. For example, if a click event that requests the performance of a critical operation, such as a request to grant privileges to an application, is not preceded by a touch event, then the systems described herein may prevent the click event and/or the critical operation from being performed. In some examples, the systems described herein may also perform additional security actions, such as identifying an application responsible for initiating the click event, quarantining the application responsible for initiating the click event, removing the application responsible for initiating the click event, notifying a user of the computing device that the application responsible for initiating the click event is potentially malicious, the like, or a combination thereof. By doing so, the systems and methods described herein may advantageously improve the state of security, and thus the overall functionality of a computing device, by detecting malicious events and/or preventing malicious events from causing harm to computing devices.

In addition, because the systems and methods described herein are not limited to any particular programming language, they may be implemented in a variety of ways and/or in a variety of computing systems and operating systems, regardless of version. As will be described in detail below, these systems and methods may also successfully detect and/or mitigate threats designed to exploit accessibility services since the disclosed systems and methods do not rely on accessibility services to detect such threats.

In sum, the provided systems and methods may prevent computing devices from executing malicious instructions, enabling unauthorized use of electronic data, permitting unauthorized access, permitting unauthorized modification of electronic data, permitting unauthorized deletion of electronic data, the like, or a combination thereof. In addition, the provided systems and methods can save power, time, processing-related expenses, data-reconstruction costs, or a combination thereof. The disclosed systems and methods may also improve the field of computer security (e.g., cybersecurity) and/or the overall state of security of computing devices by providing additional computer-security techniques.

Figure 2:
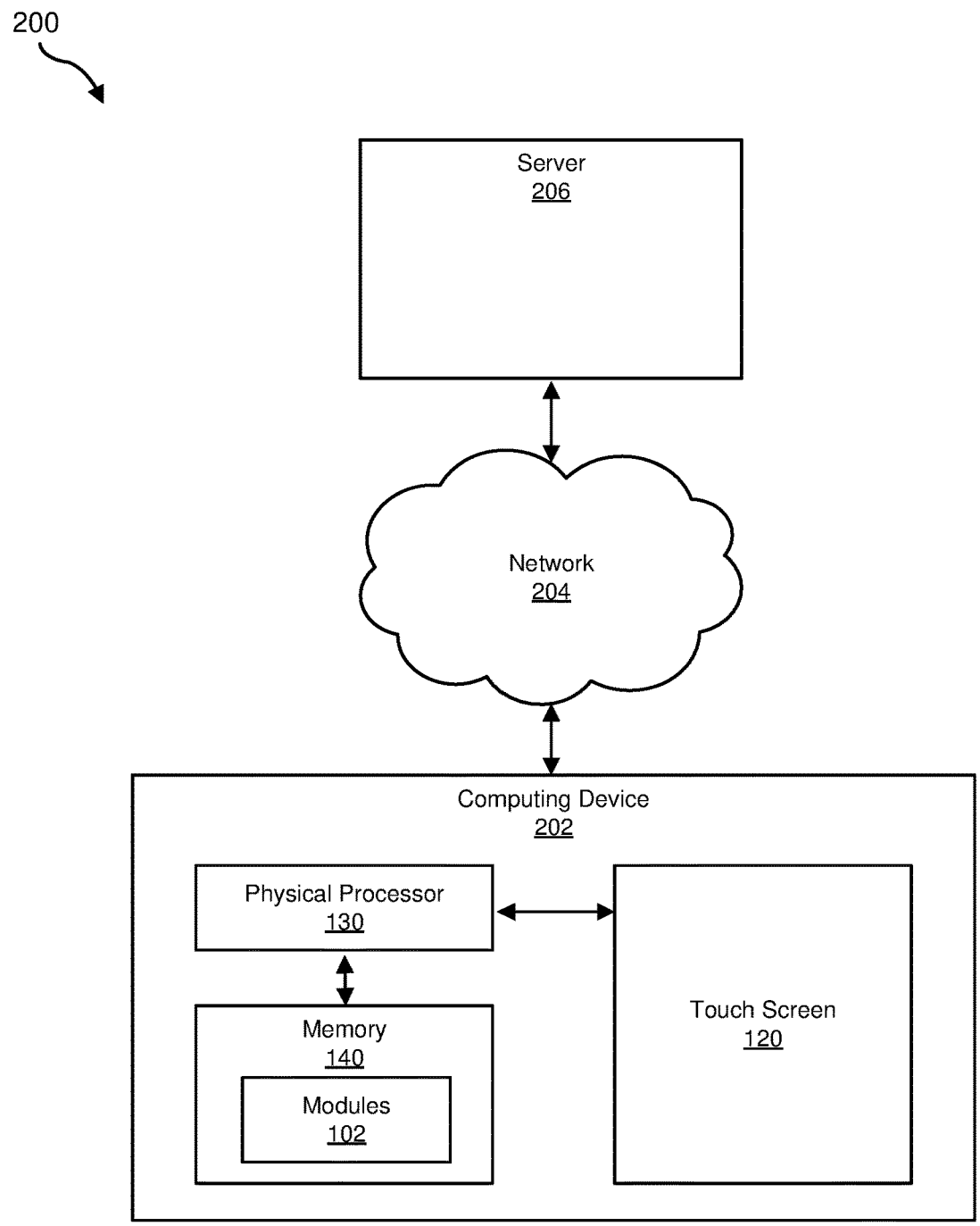
FIG. 2 is a block diagram of an additional example system for detecting malicious programmatic clicks directed to view elements displayed on touchscreens.

The following provides, with reference to FIGS. 1-2, detailed descriptions of example systems for detecting malicious programmatic clicks directed to view elements displayed on touchscreens. Detailed descriptions of corresponding computer-implemented methods will also be provided in connection with FIGS. 3-5. In addition, detailed descriptions of an example computing system and network architecture capable of implementing one or more of the embodiments described herein will be provided in connection with FIGS. 6 and 7, respectively.

FIG. 1 is a block diagram of an example system 100 for detecting malicious programmatic clicks directed to view elements displayed on touchscreens. As illustrated in this figure, example system 100 may include one or more modules 102 for performing one or more tasks. As will be explained in greater detail below, modules 102 may include a receiving module 104, a determining module 106, a classification module 108, and a security module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting malicious programmatic clicks directed to view elements displayed on touchscreens. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor. As illustrated in FIG. 1, example system 100 may also include one or more touchscreens, such as touchscreen 120.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to detect malicious programmatic clicks directed to view elements displayed on touchscreens. For example, and as will be described in greater detail below, one or more of modules 102 may cause computing device 202 and/or server 206 to receive an indication of a click event directed to a view element of a user interface displayed on a touchscreen 120 of computing device 202; determine that the click event was not immediately preceded by a touch event directed to the view element displayed on touchscreen 120; classify, in response to determining that the click event was not immediately preceded by the touch event directed to the view element, the click event as potentially malicious; and perform, in response to classifying the click event as potentially malicious, a security action that prevents the performance of an operation requested by the click event.

In some examples, modules 102 may represent all or a portion of a security application. In these examples, a user or administrator of computing device 202 may download or install the security application onto computing device 202. The security application may then monitor click and/or touch events provided by an operating system of computing device 202 in order to evaluate the content that a user of computing device 202 is attempting to access. Furthermore, in some embodiments, the security application may operate in conjunction with security server 206. For example, security server 206 may provide or host the security application for download. Additionally or alternatively, security server 206 may be configured to identify, analyze, and/or otherwise process or handle potentially harmful content identified by the security application.

Computing device 202 generally represents any type or form of computing device capable of reading computer-executable instructions. In one example, computing device 202 may represent an endpoint device (such as a smartphone or tablet) running client-side security software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device that is capable of reading computer-executable instructions. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Figure 3:
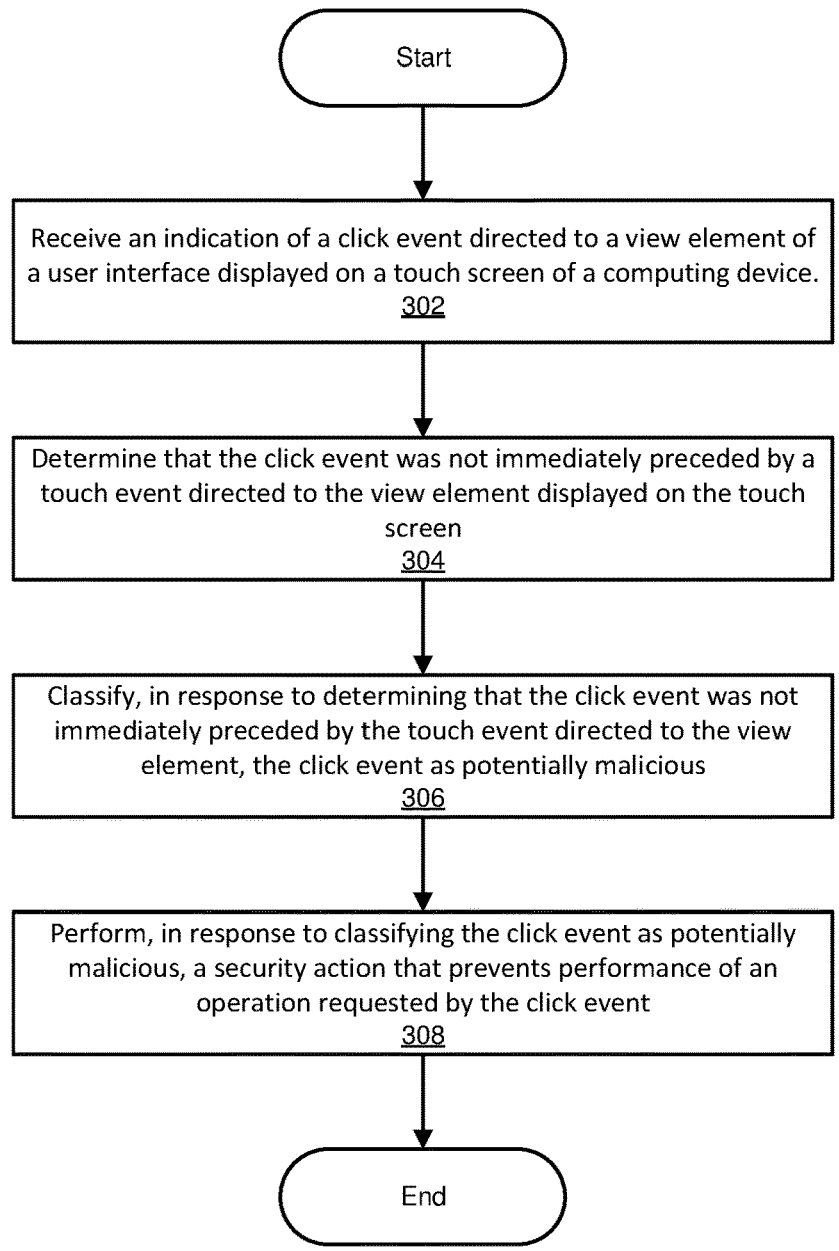
FIG. 3 is a flow diagram of an example method for detecting malicious programmatic clicks directed to view elements displayed on touchscreens.

FIG. 3 is a flow diagram of an example computer-implemented method 300 for detecting malicious programmatic clicks directed to view elements displayed on touchscreens. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below. The steps shown in FIG. 3 can be performed at least in part by processor 130.

As illustrated in FIG. 3, at step 302, one or more of the systems described herein, such as system 100 in FIG. 1 or computing device 202 in FIG. 2, may receive an indication of a click event directed to a view element of a user interface displayed on a touchscreen of a computing device. For example, receiving module 104 may, as part of computing device 202 in FIG. 2, receive an indication of a click event directed to the view element of a user interface displayed on touchscreen 120 of computing device 202.

The term "view element," as used herein, generally refers to the various building blocks of user interface components, such as a button or a text field, of an operating system that a user can see on a touchscreen and/or interact with. Examples of view elements include, without limitation, a button (such as a radio button), text, an image, a check box, etc. In some examples, view elements such as these may be part of a view element class defined within an operating system. Examples of such classes include, without limitation, button widgets, edit text widgets, text view widgets, check box widgets, image view widgets, radio button widgets, linear layouts, relative layouts, etc., or a combination thereof.

In addition, the term "click event," as used herein, generally refers to the selection and actuation of view elements to cause the occurrence of functions associated with these view elements. Examples of click events include, without limitation, selecting and actuating button widgets to dial a number on a keypad, selecting misspelled text to actuate a spell check function, and clicking on text letters to enter text into a text view widget.

Figure 4:
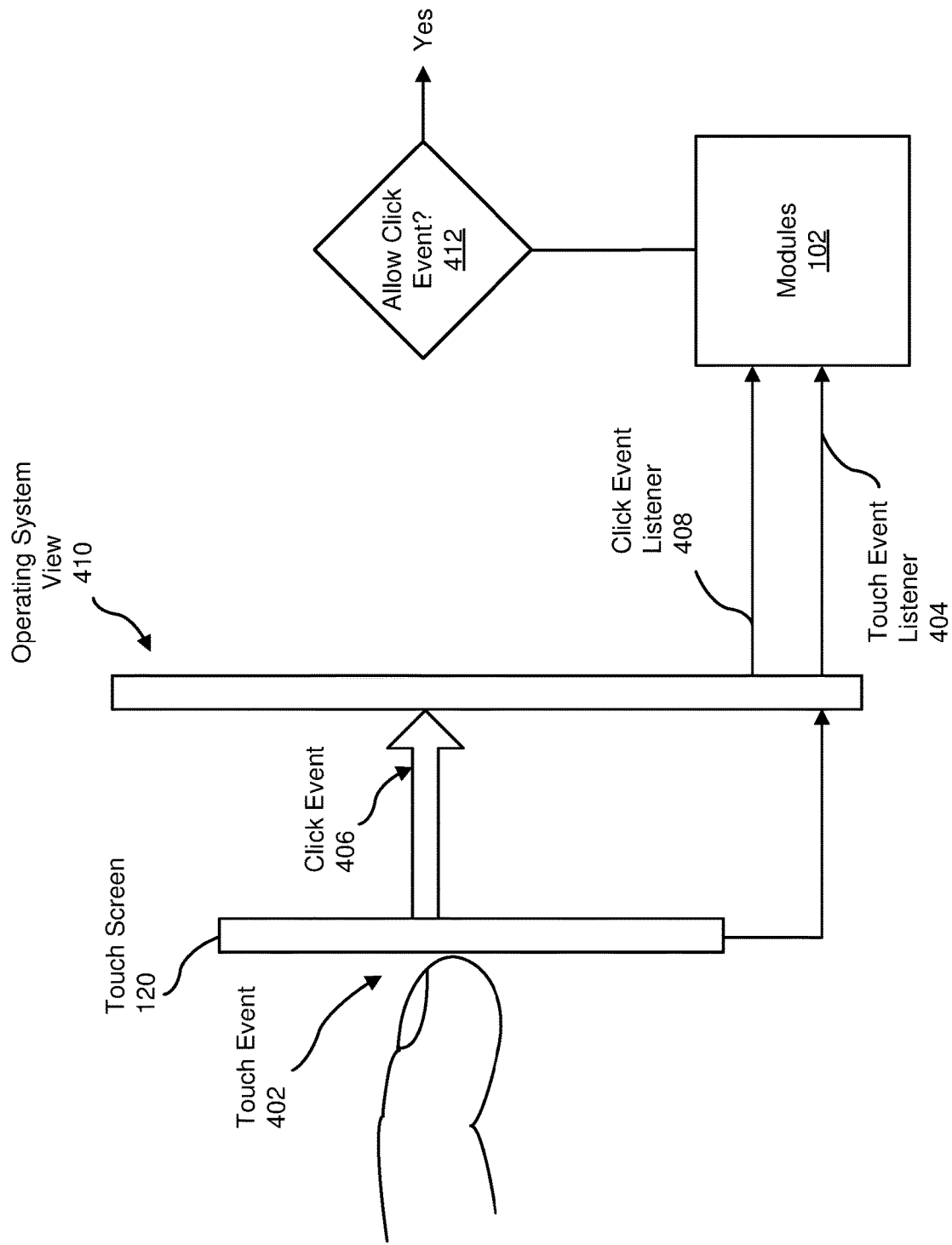
FIG. 4 is a diagram of an example non-malicious click event detected by the disclosed systems.

The systems described herein may perform step 302 in a variety of ways. In one example, receiving module 104 may perform step 302 by executing an operating system command and/or registering with an operating-system service that detects clicks events and generates notifications of the same. For example, when executing in an ANDROID environment, receiving module 104 may execute a view # performClick ANDROID command that provides a click event callback. In this example, the click event callback (e.g., OnClickListener) provided by the view # performClick command may indicate when a click event directed to a view element of a user interface displayed on touchscreen 120 of computing device 202 is going to be performed. For example, and as illustrated in FIG. 4, by executing view # performClick, modules 102 may receive, as part of a callback provided by the view # performClick command (e.g., via click event listener 408), notification when a click event 406 directed to a view element of a user interface displayed on touchscreen 120 of computing device 202 is going to be performed. Receiving module 104 may also execute similar operating system commands and/or register with similar operating-system services provided by a variety of other operating systems, including IOS, WINDOWS, and the like.

The systems described herein may also perform step 302 in a variety of contexts. In one example, receiving module 104 may receive indication of a click event when the computing device in question is operating in an accessibility mode. An accessibility mode can run in the background and receive callbacks from an operating system when an accessibility event is required. For example, an accessibility mode can assist users with audio or visual impairments (e.g., by reading text displayed on a screen, highlighting or enlarging certain elements of a user interface, etc.) and/or assist users who are temporarily unable to fully interact with a computing device. The term "accessibility event," as used herein, generally refers to any type or form of notification or message that contains information about one or more state transitions of a user interface. The phrase "state transition of a user interface," as used herein, generally refers to any type or form of change within a user interface and/or interaction between a user and a user interface. In some examples, a state transition of a user interface may occur as the result of a user providing input to the user interface, such as a user clicking a button within the user interface, changing the focus of the user interface (e.g., by zooming in), and/or entering text into an input field within the user interface. Additionally or alternatively, a state transition of a user interface may occur as the result of an application running on a computing device, such as text or audio content being displayed to a user, a new window of an application opening, and/or an application requesting user input. In some examples, an operating system of a computing device may detect and/or identify state transitions within the active window of the computing device. The term "active window" as used herein, generally refers to any user interface, notification, or audio-visual display that is currently presented to a user on the screen of a computing device.

At step 304, one or more of the systems described herein, such as system 100 in FIG. 1 or computing device 202 in FIG. 2, may determine that the click event was not immediately preceded by a touch event directed to the view element displayed on the touchscreen. For example, determining module 106 may, as part of computing device 202 in FIG. 2, determine that the click event was not immediately preceded by a touch event directed to the view element displayed on touchscreen 120 of computing device 202.

The term "touch event," as used herein, generally refers to the actuation of a specific portion of a touchscreen. Examples of touch events include, without limitation, users contacting specific portions of touchscreens to actuate touchscreen contacts associated with view elements. For example, a user may perform a touch event by touching a region of a touchscreen that displays a check box widget to select or deselect the check box.

The systems described herein may perform step 304 in a variety of ways. In one example, determining module 106 may perform step 304 by keeping track of touch events and, when a click event directed to a view element occurs, comparing the click event to the recorded touch events to determine whether the click event was immediately preceded by a corresponding touch event directed to the view element. For example, when executing in an ANDROID environment, determining module 106 may execute a view # onTouchEvent ANDROID command that provides a touch event callback. In this example, the touch event callback (e.g., OnTouchListener) provided by the view # onTouchEvent command may indicate when a touch event directed to a view element of a user interface displayed on touchscreen 120 of computing device 202 has been performed. For example, and as illustrated in FIG. 4, by executing view # onTouchEvent, modules 102 may receive, as part of a callback provided by the view # onTouchEvent command (e.g., via touch event listener 404), notification when a touch event 402 directed to a view element of a user interface displayed on touchscreen 120 of computing device 202 has been performed.

In this example, determining module 106 may determine if the view # performClick callback was preceded by a view # onTouchEvent callback. If a user initiated the touch event, then the view # onTouchEvent callback will precede the view # performClick callback. If malicious instructions initiated the view # performClick callback, however, then the view # performClick callback will not be preceded by the view # onTouchEvent callback. As such, in order to determine whether the detected click event is malicious, determining module 106 may determine whether the click event was immediately preceded by a touch event directed to the view element displayed on touchscreen 120 of computing device 202. In some examples, modules 102 may define at least one new view element class in order to accommodate this variation of view # performClick and view # onTouchEvent.

At step 306, one or more of the systems described herein, such as system 100 in FIG. 1 or computing device 202 in FIG. 2, may classify, in response to determining that the click event was not immediately preceded by a touch event directed to the view element, the click event as potentially malicious. For example, classification module 108 may, as part of computing device 202 in FIG. 2, classify, in response to determining that the click event was not immediately preceded by a touch event directed to the view element, the click event as potentially malicious.

The systems described herein may perform step 306 in a variety of ways. In some examples, classification module 108 may classify the click event based on the results of callbacks provided by an operating system command or service, such as the view # performClick and view # onTouchEvent commands in ANDROID. For example, if determining module 106 determines that a view # performClick callback in ANDROID is not preceded by a view # onTouchEvent callback, then classification module 108 may classify the click event as potentially malicious.

In some examples, classification module 108 may classify a click event as potentially malicious based solely on whether the click event was preceded by a corresponding touch event. In other examples, classification module 108 may evaluate other factors (e.g., the reputation of an application that generated the click event, the source of origin of such an application, etc.) and/or communicate with other devices (such as, e.g., server 206 in FIG. 2) in order to make such a classification.

At step 308, one or more of the systems described herein, such as system 100 in FIG. 1 or computing device 202 in FIG. 2, may perform, in response to classifying the click event as potentially malicious, a security action that prevents performance of an operation requested by the click event. For example, security module 110 may, as part of computing device 202 in FIG. 2, perform, in response to classifying the click event as potentially malicious, a security action that prevents the performance of an operation requested by the click event.

The systems described herein may perform step 308 in a variety of ways. In one example, security module 110 may completely prevent performance of the click event in question. Additionally or alternatively, security module 110 may identify an application responsible for initiating the click event, quarantine the application responsible for initiating the click event, remove the application responsible for initiating the click event, and/or notify a user of the computing device that the application responsible for initiating the click event is potentially malicious.

Security module 110 may block a variety of operations requested by click events, including, without limitation, requests to grant privileges to an application, authorize a specific user to perform an operation on the computing device, authorize a transaction (such as a fraudulent bank transaction), access local or remote computing resources (such as websites or removable storage devices), etc. As used herein, the term "privileges" can include access to system data, resources, features, or information outside of applications' traditionally limited access. For example, applications may request read/write access to a user's calendar, contacts, camera, or sensors (such as GPS sensors, microphones, etc.) or to storage containing users' confidential data.

FIG. 4 is a diagram of an example non-malicious click event that may be detected by the disclosed systems. In this example, a touch event 402 occurs when a user touches a touchscreen 120. Modules 102 then receive an indication of touch event 402 from operating system view 410 via touch event listener 404. In this example, touch event 402 also triggers a click event 406 on a view element associated with the portion of touchscreen 402 that was touched. In response, operating system view 410 identifies the occurrence of click event 406 and sends an indication of the occurrence of click event 406 to modules 102 via click event listener 408. Since, in this example, touch event 402 preceded click event 406, modules 102 may determine at decision block 412 to allow click event 406.

Figure 5:
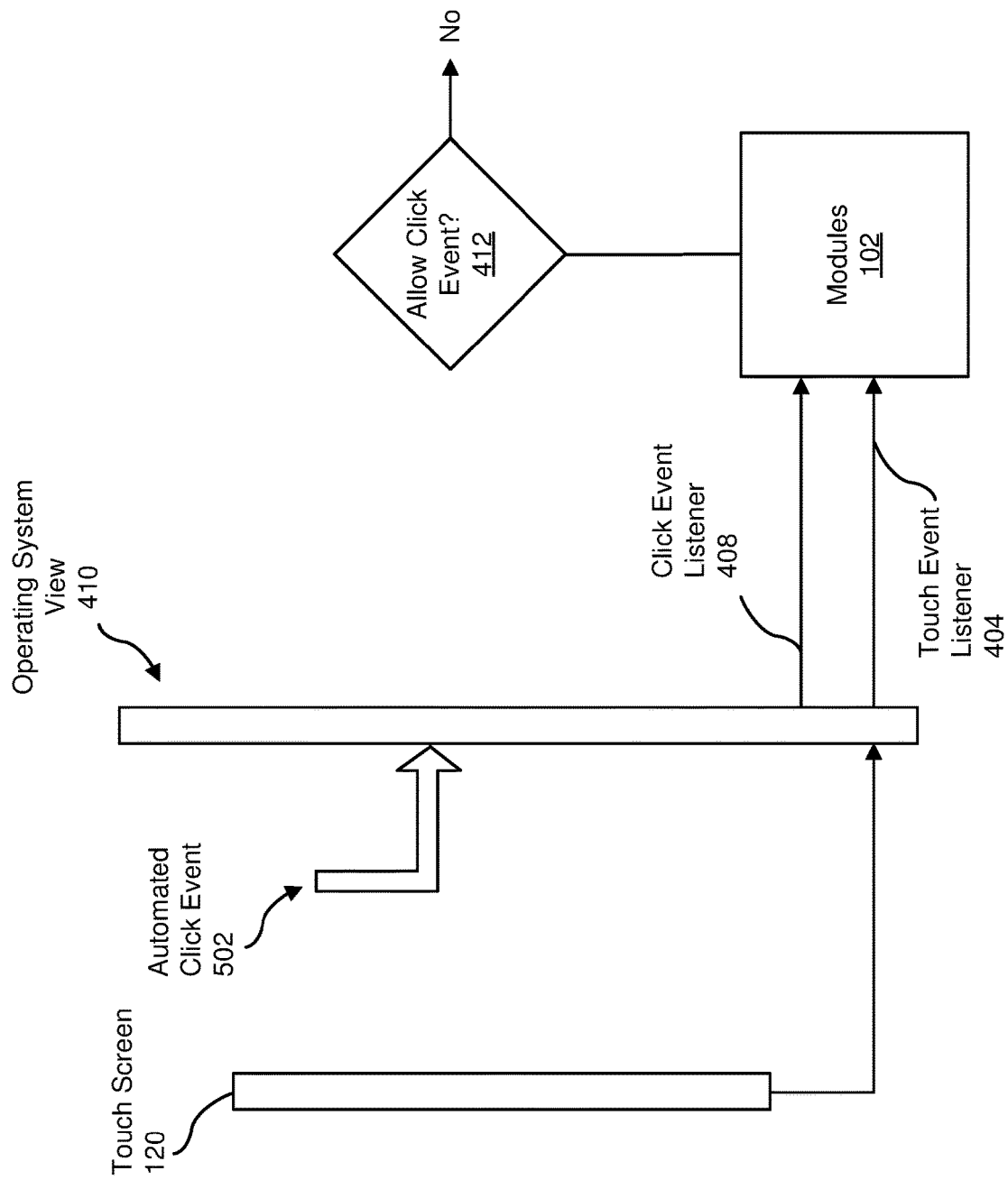
FIG. 5 is a diagram of an example malicious click event detected by the disclosed systems.

FIG. 5 is a diagram of an example malicious click event that may be detected and prevented by the disclosed systems. In this example, operating system view 410 may notify modules 102, via click event listener 408, of a click event (e.g., automated click event 502) upon occurrence of the same. Upon receiving an indication that this click event has occurred (via, e.g., click event listener 408), modules 102 may determine whether a corresponding touch event preceded the click event in question. Since, in this example, the click event was automatically generated (and thus not preceded by a corresponding touch event), modules 102 may determine that automated click event 502 was automatically generated and, thus, potentially malicious. In response to this determination, modules 102 may determine, at decision block 412, to block automated click event 506 and/or an operation requested by the same As detailed above, by determining whether a click event follows a touch event, the systems and methods described herein may identify malicious programmatic clicks and then prevent and/or mitigate the effects of the same. If a click event does not follow a corresponding touch event, then the disclosed systems may identify the click event as potentially malicious and then block the click event and/or an operation requested by the same. For example, if the systems described herein determine that a click event directed to a view element that grants elevated privileges to an application does not follow a corresponding touch event, then these systems may block the click event and/or the requested privileges. By doing so, the systems described herein may protect users, their computing devices, and their data from malicious programmatic clicks designed to exploit the same, thereby improving the state of security of such devices and data.

Figure 6:
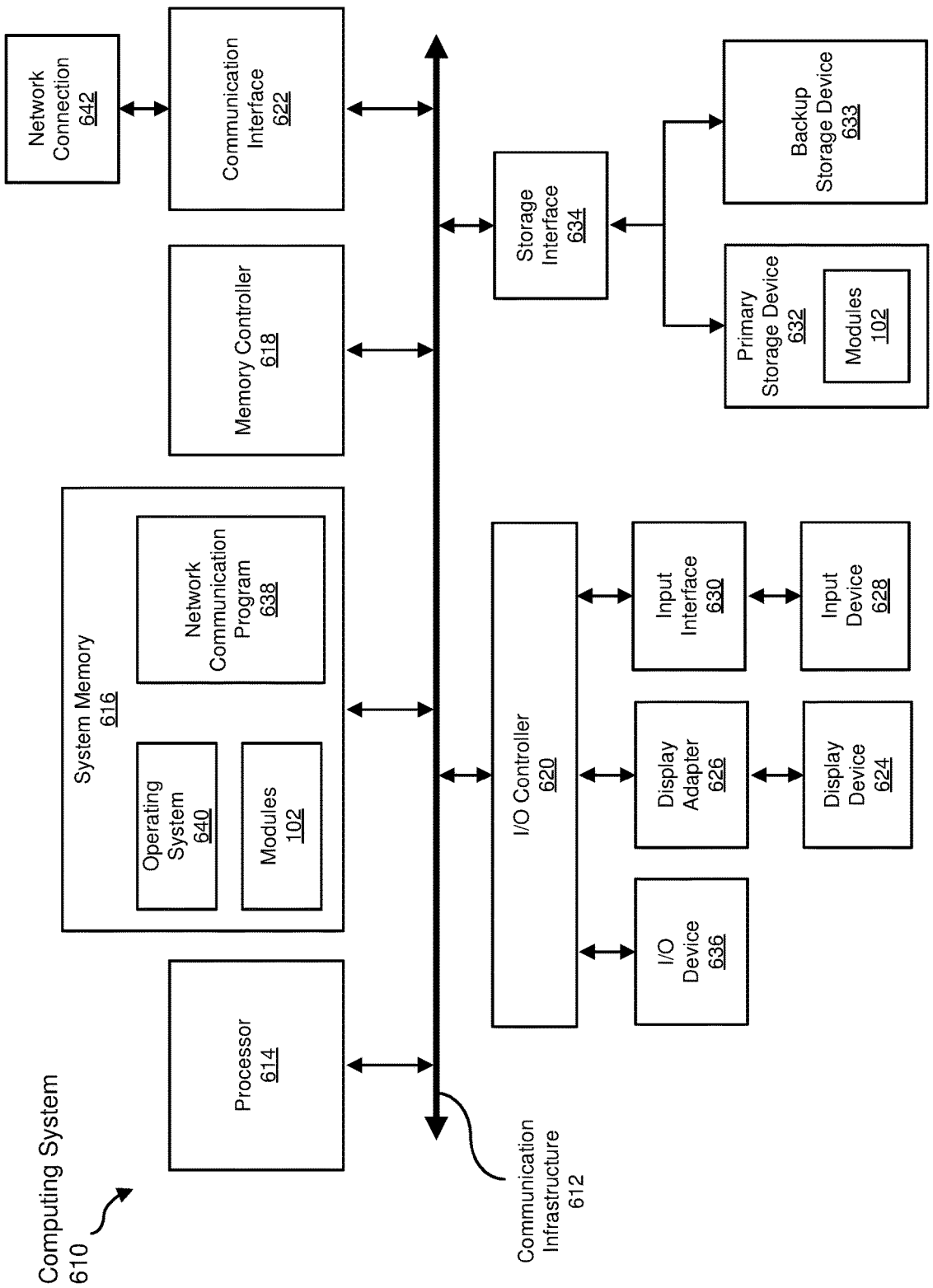
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, modules 102 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
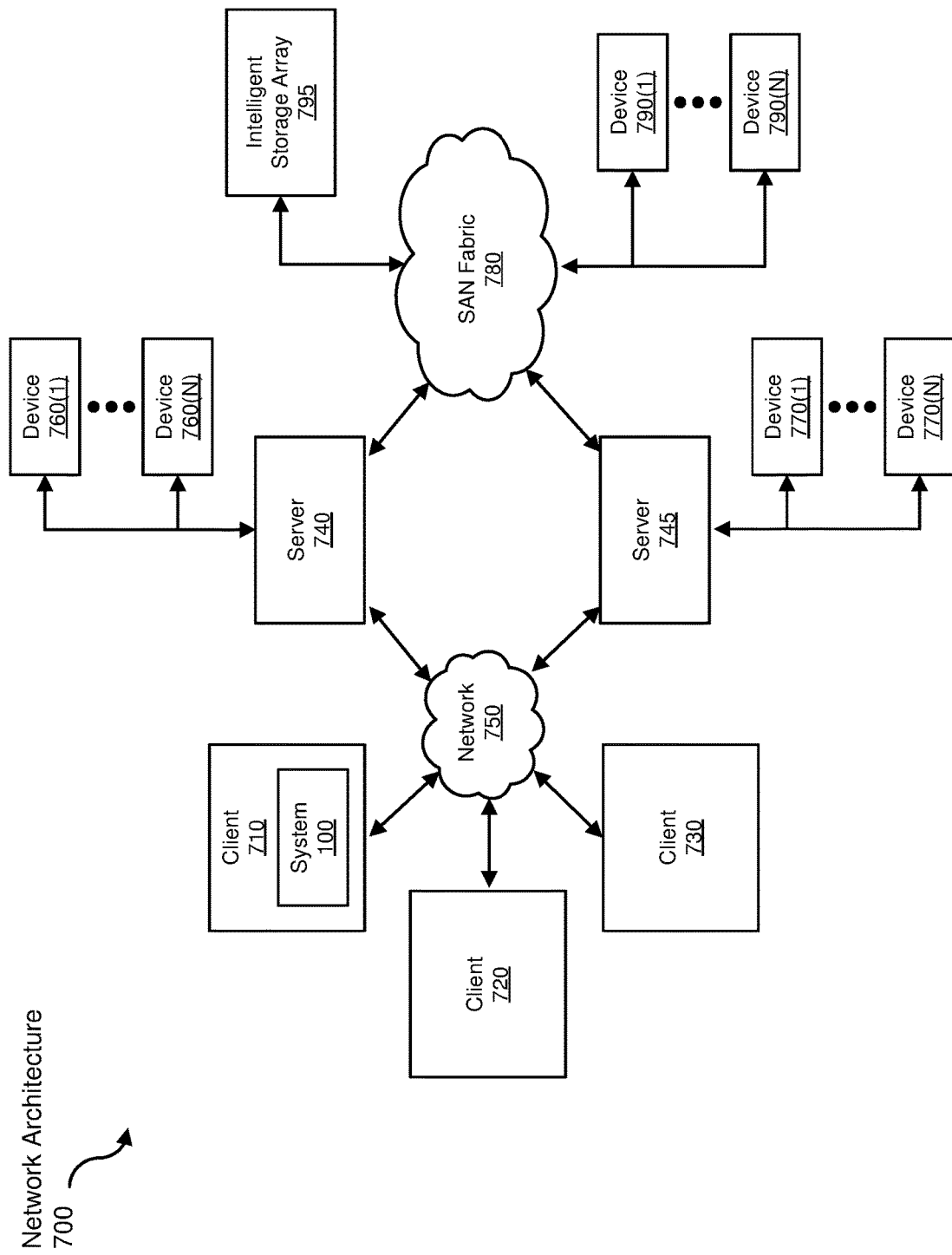
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for detecting malicious programmatic clicks directed to view elements displayed on touchscreens.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed.

The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive touch event data, click event data, or both to be transformed, transform the touch event data, click event data, or both, output a result of the transformation to indicate malicious activity, use the result of the transformation to perform a security action, or a combination thereof. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting malicious programmatic clicks directed to view elements displayed on touchscreens, at least a portion of the method being performed by a computing device comprising at least one processor, the method comprising:
   receiving, at the processor, an indication of a click event directed to a view element of a user interface displayed on a touchscreen of the computing device;
   identifying, at the processor and by using an operating system view, the occurrence of the click event;
   determining, at the processor, that the click event identified by the operating system view was not immediately preceded by a recorded touch event on the touchscreen directed to the view element displayed on the touchscreen;
   classifying, in response to determining that the click event was not immediately preceded by the touch event directed to the view element, the click event as potentially malicious; and
   performing, in response to classifying the click event as potentially malicious, a security action that prevents performance of an operation requested by the click event.

2. The method of claim 1, wherein the indication of the click event is received in a click event callback.

3. The method of claim 1, wherein the indication of the click event is received when the computing device is operating in an accessibility mode.

4. The method of claim 1, wherein the operation requested by the click event comprises a request to at least one of:
   grant privileges to an application;
   authorize a specific user to perform an operation on the computing device;
   authorize a transaction; and
   access a local or remote computing resource.

5. The method of claim 1, wherein performing the security action comprises preventing performance of the click event on the view element.

6. The method of claim 1, wherein performing the security action comprises at least one of:
   identifying an application responsible for initiating the click event;
   quarantining the application responsible for initiating the click event;
   removing the application responsible for initiating the click event; and
   notifying a user of the computing device that the application responsible for initiating the click event is potentially malicious.

7. The method of claim 1, wherein the view element displayed on the touchscreen is in a view element class comprising at least one of:
   a button widget;
   an edit text widget;
   a text view widget;
   a check box widget;
   an image view widget;
   a radio button widget;
   a linear layout; and
   a relative layout.

8. A system for detecting malicious programmatic clicks directed to view elements displayed on touchscreens, the system comprising:
   a receiving module, stored in a memory, that receives an indication of a click event directed to a view element of a user interface displayed on a touchscreen of a computing device and identifies, using an operating system view, the occurrence of the click event;
   a determining module, stored in the memory, that determines that the click event identified by the operating system view was not immediately preceded by a recorded touch event on the touchscreen directed to the view element displayed on the touchscreen;
   a classification module, stored in the memory, that classifies, in response to determining that the click event was not immediately preceded by the touch event directed to the view element, the click event as potentially malicious;

a security module, stored in the memory, that performs, in response to classifying the click event as potentially malicious, a security action that prevents performance of an operation requested by the click event; and at least one physical processor coupled to the memory and configured to execute at least one module stored in the memory.

9. The system of claim 8, wherein the determining module receives the indication of the click event in a click event callback.

10. The system of claim 8, wherein the determining module receives the indication of the click event when the computing device is in an accessibility mode.

11. The system of claim 8, wherein the operation requested by the click event comprises a request to at least one of:
   grant privileges to an application;
   authorize a specific user to perform an operation on the computing device;
   authorize a transaction; and
   access a local or remote computing resource.

12. The system of claim 8, wherein the security action comprises preventing performance of the click event on the view element.

13. The system of claim 8, wherein the security action comprises at least one of:
   identifying an application responsible for initiating the click event;
   quarantining the application responsible for initiating the click event;
   removing the application responsible for initiating the click event; and
   notifying a user of the computing device that the application responsible for initiating the click event is potentially malicious.

14. The system of claim 8, wherein the view element displayed on the touchscreen is in a view element class comprising at least one of:
   a button widget;
   an edit text widget;
   a text view widget;
   a check box widget;
   an image view widget;
   a radio button widget;
   a linear layout; and
   a relative layout.

15. A non-transitory computer-readable medium comprising one or more computer-executable instructions that, when executed by at least one processor of a computing device, cause the computing device to:
   receive an indication of a click event directed to a view element of a user interface displayed on a touchscreen of the computing device;
   identify, using an operating system view, the occurrence of the click event;
   determine that the click event identified by the operating system view was not immediately preceded by a recorded touch event on the touchscreen directed to the view element displayed on the touchscreen;
   classify, in response to determining that the click event was not immediately preceded by the touch event directed to the view element, the click event as potentially malicious; and
   perform, in response to classifying the click event as potentially malicious, a security action that prevents performance of an operation requested by the click event.

16. The non-transitory computer-readable medium of claim 15, wherein the indication of the click event is received in a click event callback.

17. The non-transitory computer-readable medium of claim 15, wherein the operation requested by the click event comprises a request to at least one of:
   grant privileges to an application;
   authorize a specific user to perform an operation on the computing device;
   authorize a transaction; and
   access a local or remote computing resource.

18. The non-transitory computer-readable medium of claim 15, wherein the security action comprises preventing performance of the click event on the view element.

19. The non-transitory computer-readable medium of claim 15, wherein the computer-executable instructions that cause the computing device to perform the security action comprise computer-executable instructions configured to cause the computing device to at least one of:
   identify an application responsible for initiating the click event;
   quarantine the application responsible for initiating the click event;
   remove the application responsible for initiating the click event; and
   notify a user of the computing device that the application responsible for initiating the click event is potentially malicious.

20. The non-transitory computer-readable medium of claim 15, wherein the view element displayed on the touchscreen is in a view element class comprising at least one of:
   a button widget;
   an edit text widget;
   a text view widget;
   a check box widget;
   an image view widget;
   a radio button widget;
   a linear layout; and
   a relative layout.

* * * * *